H. S. DICKINSON.
DRIVING GEARING FOR SEED DISCHARGING MECHANISM.
APPLICATION FILED OCT. 5, 1917.
1,316,697.
Patented Sept. 23, 1919.
2 SHEETS—SHEET 2.
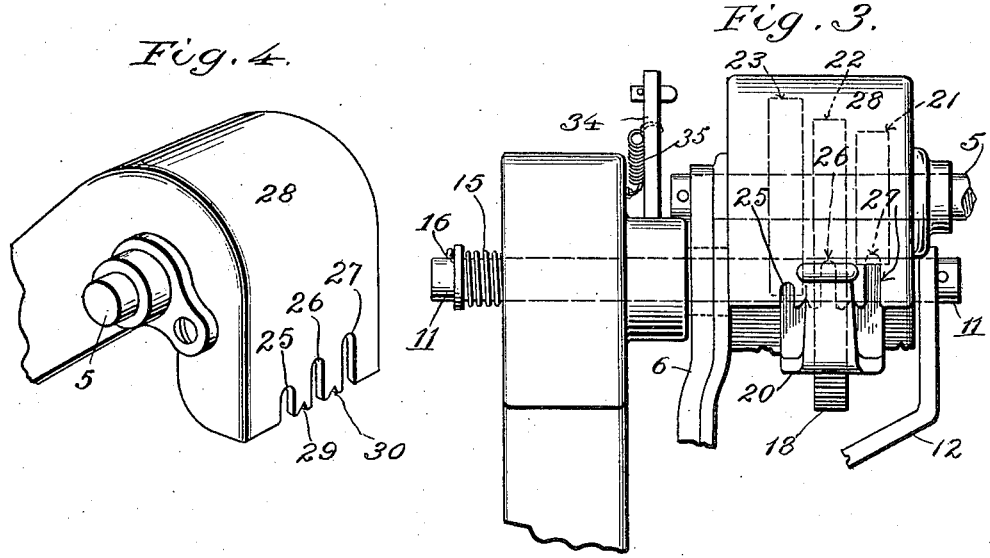
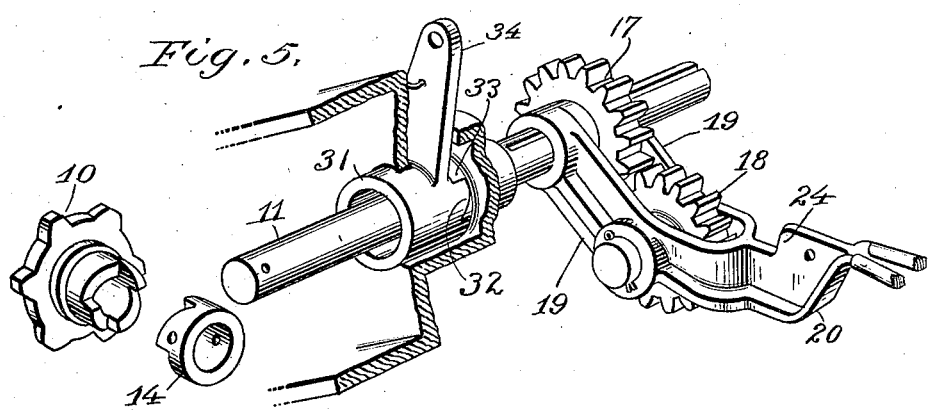

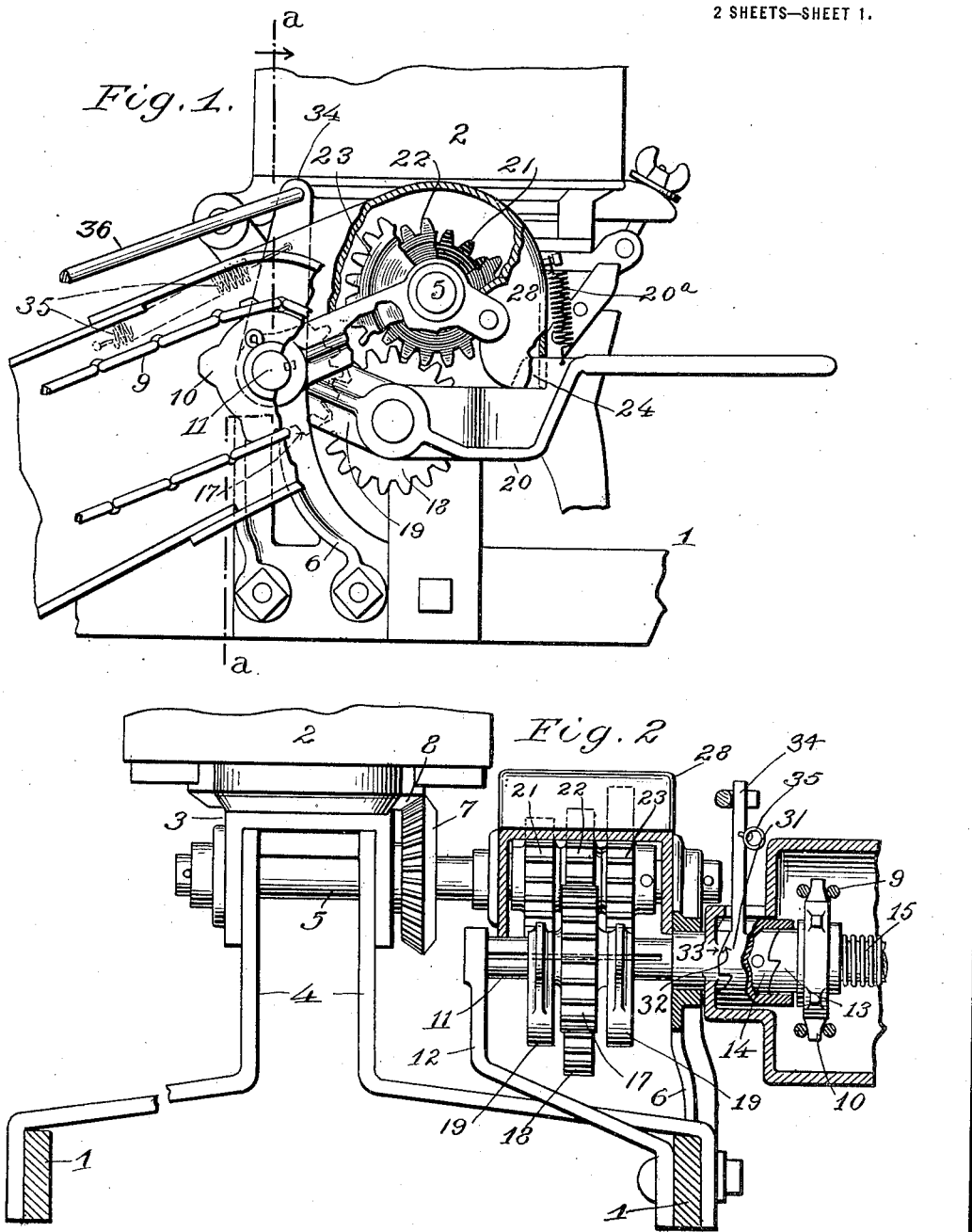

UNITED STATES PATENT OFFICE.

HARRY S. DICKINSON, OF MOLINE, ILLINOIS, ASSIGNOR TO MOLINE PLOW COMPANY, A CORPORATION OF ILLINOIS.

DRIVING-GEARING FOR SEED-DISCHARGING MECHANISM.

1,316,697.  Specification of Letters Patent.  Patented Sept. 23, 1919.

Original application filed February 21, 1917, Serial No. 149,981. Divided and this application filed October 5, 1917. Serial No. 194,882.

*To all whom it may concern:*

Be it known that I, HARRY S. DICKINSON, a citizen of the United States, residing at Moline, in the county of Rock Island and State of Illinois, have invented certain new and useful Improvements in Driving-Gearing for Seed-Discharging Mechanism, of which the following is a specification, reference being had therein to the accompanying drawing, being a division of original application filed February 21, 1917, Serial No. 149,981.

This invention relates to seed planting machines and has reference more particularly to the gearing for driving the seed mechanism from the ground wheel of the machine in the advance of the same through the field. My invention consists of improved means for varying the discharge of the seed according to the condition of soil encountered in different localities, it being desirable to plant the seed at closer intervals where the soil conditions are poor and at greater intervals where the soil conditions are good.

In the accompanying drawings:

Figure 1 is a side elevation of so much of a seed planting machine as is necessary to illustrate my invention, certain parts being broken away to expose other parts to view.

Fig. 2 is a sectional elevation of the same on the line $a-a$ of the preceding figure as viewed in the direction of the arrow in said figure.

Fig. 3 is a rear elevation of the parts shown in Fig. 2.

Fig. 4 is a perspective view of the inclosing casing for the change gears, showing the means whereby the controlling lever may be set in different positions.

Fig. 5 is a perspective view of the parts of the seed discharge controlling mechanism separated from each other.

Referring to the drawings:

1 designates a portion of the machine frame or support. 2 designates a seed can or hopper containing in its bottom as usual a seed discharging mechanism (not shown), the can or hopper being supported from the frame of the machine by a bracket 3 connected by means of vertical standards 4 to the machine frame.

5 designates a horizontal seed shaft which is mounted in suitable bearings in the bracket and in a standard 6 extending upwardly from the machine frame. The shaft carries a vertical bevel pinion 7 which meshes with a horizontal bevel pinion 8 operatively connected with and driving the seed discharging mechanism.

The seed shaft receives its motion from one of the ground wheels (not shown) of the machine by means of a sprocket chain 9 which passes around a sprocket wheel 10 loosely mounted on the outer end of a horizontal counter-shaft 11 extending parallel with and in front of the seed shaft and mounted in an arm 12 extending upwardly from the machine frame and in the standard 6 before alluded to, the said countershaft being adapted to operate the seed discharging mechanism through driving gearing presently to be described.

The sprocket wheel 10 has fixed to its inner side a driving clutch member 13 which is adapted, when the sprocket wheel is rotated in the advance of the machine, to make driving connection with a driven clutch member 14 fixed to the counter-shaft and drive the same, but which when rotated in the opposite direction, is adapted to move outwardly on the shaft and disengage from the driven clutch member, and thus rotate idly without affecting the counter-shaft. The sprocket wheel is acted on at its outer side by a spiral spring 15 surrounding the outer end of the shaft and confined thereon by a head 16 on the end of the shaft, the tendency of the spring being to maintain the engagement of the two clutch members, while permitting the wheel to be moved against the pressure of the spring to disengage the clutch. As a result of this construction, the seed discharging mechanism will not be driven when the machine is backed, and it may be thrown out of action at the will of the driver during the advance of the machine.

The counter-shaft 11 has splined to it a spur pinion 17 which may be shifted longitudinally of the shaft and is in constant mesh with a transmitting pinion 18 mounted loosely between parallel arms 19 on a lever 20. The forward ends of these arms are mounted loosely on the counter-shaft at opposite sides of the spur pinion 17 so that by shifting the lever horizontally, this pinion and the transmitting pinion 18 will be correspondingly shifted and the latter brought opposite to any one of three driven pinions 21, 22 and 23 fixed on the seed shaft; and by rocking the lever up and down on the axis of the shaft, the transmitting pinion may be caused to engage respectively with said driven pinions.

The driven pinions 21, 22 and 23 are of different diameters in order to impart different speeds of rotation to the seed shaft according to which particular one of the pinions is engaged by the transmitting pinion. When the lever is shifted and set to engage the transmitting pinion with the smallest pinion 21, the seed shaft will be driven at the highest rate of speed, and when engaged with the largest pinion 23 the seed shaft will be driven at the lowest rate of speed, and when engaged with the pinion 22 the seed shaft will be driven at an intermediate rate of speed.

The mechanism described constitutes a changeable speed gearing for varying the action of the seed discharging mechanism in order that the seed deposited in the ground may be spaced at shorter or longer intervals according to the conditions of the soil.

The lever 20 is held in its different positions of adjustment so as to control the engagement of the transmitting pinion with one or the other of the driven pinions, by means of a lug or nose 24 projecting upwardly from the lever and adapted to be engaged in any one of three notches 25, 26 and 27 of respectively different depths in the lower edge of a member fixed relatively to the machine frame, and in the present instance in the form of a casing 28 extending over and inclosing the three driven pinions. The notch 25 of the least depth is arranged opposite the largest pinion 23 and when the nose of the lever is engaged in this notch and lifted upwardly with the nose abutting against the upper wall of the notch, the transmitting pinion will be maintained in mesh with the largest pinion and the motion of the ground wheel will be transmitted to the seed shaft through the sprocket wheel 10, spur pinion 17, transmitting pinion 18, and largest driven pinion 23 at a reduced speed. In changing to a higher speed the hand lever 20 is depressed to disengage its nose from the notch, which action will disengage the transmitting pinion from the driven pinion 23, and the lever 20 is then shifted horizontally and its nose brought opposite say the notch 27 of the greatest depth, and the nose being drawn upwardly into said notch, the transmitting pinion will be engaged with the smallest driven pinion, and the motion of the ground wheel will be transmitted to the seed shaft at a greater speed than in the first adjustment of the parts. The lower edge of the casing between the several notches is formed with depressions 29 and 30 adapted to receive the nose on the lever and hold the transmitting pinion disengaged from either of the three driven pinions, this position of the lever being for the purpose of disconnecting the seed shaft from its driving gearing and preventing the action of the seed discharging mechanism. The lever 20 is acted on by a spring 20$^a$ connected at its lower end with the lever and at its upper end with the fixed part of the frame, the tendency of the spring being to hold the lever yieldingly in its upper position to coöperate with the notches in the casing 28.

The seed discharging mechanism of the present machine is adapted for planting corn or other seed, and is of such form and construction as is well known in this art, that a given number of kernels is dropped periodically so as to plant the hills at predetermined intervals. By increasing the speed of the mechanism, or decreasing the same, it will follow that the hills will be planted at lesser or greater intervals, as the case may be. The changeable speed mechanism which I have described provides for this variation and enables the hills to be planted closer together where the soil is in good condition, or at greater intervals where the soil is poorer. This mechanism is not confined to the planting of the seed in hills as mentioned, but is applicable as well in connection with seed discharging mechanism in which the seed is drilled or planted continuously, the variation in the speed, causing a greater or less amount of seed, as the case may be, to be deposited in the ground for a given distance of travel of the machine. In order to throw the seed discharging mechanism out of action I provide a clutch operating member in the form of a sleeve 31 which loosely surrounds the clutch members 13 and 14 before alluded to, and has its outer end arranged adjacent the inner side of the sprocket wheel 9. This sleeve is formed at its inner end with sloping teeth 32 which engage corresponding teeth 33 projecting outwardly from the bearing in the standard 6 in which the counter-shaft is mounted. The sleeve 31 is both oscillatable and movable endwise of the clutch members, the relation and form of the teeth being such that when the sleeve is oscillated rearwardly, it will be forced outwardly and the outer end of the sleeve engaging the sprocket wheel, the latter will be pushed axially and will disengage the driving clutch member 13 thereon from the driven clutch member 14 on the counter-shaft, and the sprocket wheel will then revolve without imparting motion to the counter-shaft and the operation of the seeding mechanism will be arrested. The sleeve is operated to control the operation of the clutch by means of an operating arm 34 fixed to the sleeve projecting upwardly therefrom. This arm is acted on by a spring 35 connected at its rear end to the arm and at its forward end to the machine frame or to a part fixed relatively thereto, the tendency of the spring being to hold the sleeve 31 in its forward position with its outer end disengaged from the sprocket-wheel and the latter in driving engagement with the counter-shaft. The arm 34 is moved in a rearward direction to shift the sleeve and disengage the clutch, by means of a rod or link 36 connected with the upper end of the arm, as shown in Fig. 1.

This mechanism constitutes a simple, durable and effective operating means for controlling the operation of the seed discharging mechanism, and by arranging the operating parts of this mechanism at a point remote from the ground wheel axis, the parts are well removed from the surface of the soil so that liability of the operative mechanism becoming clogged with dirt and trash is avoided.

In the foregoing description and accompanying drawings I have disclosed my invention in the particular form and embodiment I prefer to adopt, which embodiment has been found in practice to answer to a satisfactory degree the objects in view. It will be manifest, however, that these details may be variously changed and modified by the skilled mechanic without departing from the limits of my invention; and it will be understood that the invention is not limited to any particular form or construction of the parts except in so far as such limitations are specified in the claims.

Having thus described my invention, what I claim is:

1. In a variable speed gear mechanism, the combination of a driving shaft, a driven shaft arranged parallel therewith and provided with driven pinions of respectively different diameters, a driving pinion splined to the driving shaft to rotate therewith and to move longitudinally thereof, a rockable member shiftable longitudinally on the driving shaft and engaging the driving pinion to shift the same longitudinally on the shaft, a transmitting pinion journaled in said rockable member in constant mesh with the driving pinion, and adapted by the shifting motion of the member to be set opposite the respective driven pinions, and adapted by the rocking motion of the member to be engaged with the respective driven pinions, and a spring acting on said rockable member and tending to move the same toward the driven pinions to maintain the transmitting pinion in mesh therewith.

2. In a variable speed gear mechanism, the combination of a driving shaft, a driven shaft arranged parallel therewith and having fixed thereon a plurality of driven pinions of respectively different diameters, a driving pinion splined to the driving shaft to rotate therewith and to move longitudinally thereof, a rockable member shiftable longitudinally of the driving shaft and engaging the driving pinion to shift the same longitudinally thereon, a transmitting pinion journaled in said rockable member and in constant mesh with the driving pinion, said transmitting pinion adapted by the shifting motion of the member to be set opposite the respective driven pinions, and adapted by the rocking motion of the member to be engaged with the respective driven pinions, a member sustained in fixed relation to said parts and provided with notches adapted to receive the rockable member and determine the engagement of the transmitting pinion with the respective driven pinions, and provided also with notches intermediate of said first mentioned notches, to receive the rockable member and hold the same with the transmitting pinion out of mesh with the driven pinions, and a spring acting on the rockable member and tending to engage the same in said notches.

In testimony whereof, I have affixed my signature.

HARRY S. DICKINSON.

Copies of this patent may be obtained for five cents each, by addressing the "Commissioner of Patents, Washington, D. C."